United States Patent
K et al.

(10) Patent No.: US 10,180,872 B2
(45) Date of Patent: Jan. 15, 2019

(54) METHODS AND SYSTEMS THAT IDENTIFY PROBLEMS IN APPLICATIONS

(71) Applicant: VMWARE, INC., Palo Alto, CA (US)

(72) Inventors: Thangamani K, Bangalore (IN); Dinesh Surajmal, Bangalore (IN); Kumaran Kamala Kannan, Bangalore (IN); Hari Hara Subramanian Nagaiyanallur Sairam, Bangalore (IN); Ramachandran Krishnan, Bangalore (IN)

(73) Assignee: VMware, Inc., Palo Alto, CA (US)

(*) Notice: Subject to any disclaimer, the term of this patent is extended or adjusted under 35 U.S.C. 154(b) by 174 days.

(21) Appl. No.: 15/232,840

(22) Filed: Aug. 10, 2016

(65) Prior Publication Data

US 2017/0300401 A1 Oct. 19, 2017

(51) Int. Cl.
| | | |
|---|---|---|
| *G06F 11/00* | (2006.01) | |
| *G06F 11/07* | (2006.01) | |
| *H04L 12/26* | (2006.01) | |
| *H04L 12/24* | (2006.01) | |
| *G06F 11/34* | (2006.01) | |

(52) U.S. Cl.
CPC ........ *G06F 11/079* (2013.01); *G06F 11/0706* (2013.01); *G06F 11/0778* (2013.01); *G06F 11/34* (2013.01); *H04L 41/069* (2013.01); *H04L 41/0631* (2013.01); *H04L 43/045* (2013.01)

(58) Field of Classification Search
CPC ............. G06F 11/3612; G06F 11/0706; G06F 11/079; G06F 11/0751
See application file for complete search history.

(56) References Cited

U.S. PATENT DOCUMENTS

| 6,029,258 A * | 2/2000 | Ahmad | G06F 11/366 |
|---|---|---|---|
| | | | 714/26 |
| 6,282,701 B1 * | 8/2001 | Wygodny | G06F 11/3466 |
| | | | 702/183 |
| 9,021,428 B2 * | 4/2015 | Ajith Kumar | G06F 11/3612 |
| | | | 717/113 |

(Continued)

OTHER PUBLICATIONS

CAFC,*Electric Power Group, LLC* v. *Alstom S.A.*, pp. 1-12 (Year: 2016).*

*Primary Examiner* — Marc Duncan
*Assistant Examiner* — Jonathan D Gibson

(57) ABSTRACT

Methods that use marking, leveling and linking ("MLL") processes to identify problems and dynamically correlate events recorded in various log files generated for a use-case of an application are described. The marking process determines fact objects associated with the use-case from events recorded in the various log files, database dumps, captured user actions, network traffic, and third-party component logs in order to identify non-predefined problems with running the application in a distributed computing environment. The MLL methods do not assume a predefined input format and may be used with any data structure and plain log files. The MLL methods present results in a use-case trace in a graphical user interface. The use-case trace enables human users to monitor and troubleshoot execution of the application. The use-case trace identifies the types of non-predefined problems that have occurred and points in time when the problems occurred.

24 Claims, 18 Drawing Sheets

(56) References Cited

U.S. PATENT DOCUMENTS

| | | | |
|---|---|---|---|
| 9,535,780 B2 * | 1/2017 | Rajamanickam | G06F 11/0781 |
| 2014/0122932 A1 * | 5/2014 | Chen | G06F 11/0706 |
| | | | 714/37 |
| 2015/0106324 A1 * | 4/2015 | Puri | G06N 5/04 |
| | | | 706/52 |
| 2015/0212869 A1 * | 7/2015 | Chen | G06F 11/0706 |
| | | | 714/38.1 |
| 2015/0347923 A1 * | 12/2015 | Bartley | G06F 11/079 |
| | | | 706/12 |
| 2015/0370799 A1 * | 12/2015 | Kushmerick | H04L 43/028 |
| | | | 707/740 |
| 2016/0124795 A1 * | 5/2016 | Shimizu | G06F 11/0703 |
| | | | 714/37 |
| 2016/0224401 A1 * | 8/2016 | Adinarayan | G06F 11/079 |
| 2016/0350170 A1 * | 12/2016 | Hermany | G06F 11/079 |

* cited by examiner

| Date | Time | HC | IP Add. | Phrase | Event type |
|------|------|----|---------|--------|------------|
| 404 | 406 | 408 | 410 | 412 | 414 |

Application log / 502

| | | | | | |
|---|---|---|---|---|---|
| d | 13:20 | | | Display bank page | 01249 |
| d | 13:27 | | | Display field and keypad for PIN | 11056 |
| d | 13:29 | | | Valid PIN number | 1349 |
| d | 13:29 | | | Display amount options and keypad | 87210 |
| d | 13:30 | | | Compare amount to available funds | 30246 |
| d | 13:32 | | | Error: Eject card | 27811 |

Event log / 504

| | | | | | |
|---|---|---|---|---|---|
| d | 13:26 | | | Card received | 3357 |
| d | 13:28 | | | PIN entered | 6130 |
| d | 13:30 | | | Amount option entered | 71103 |
| d | 13:32 | | | Card removed | 31203 |

System log / 505

| | | | | | |
|---|---|---|---|---|---|
| d | 13:31 | | | Out of memory | 22001 |
| d | 13:32 | | | Machine shutdown | 439 |
| d | 13:37 | | | Machine startup | 00231 |
| d | 13:39 | | | Collect statistical data | 43211 |

FIG. 5

| | | |
|---|---|---|
| Event log | $T_1$ | $E_1$ |
| Event log | $T_{14}$ | $E_{14}$ |
| Application log | $T_2$ | $E_2$ |
| Application log | $T_4$ | $E_4$ |
| Application log | $T_6$ | $E_6$ |
| Application log | $T_{15}$ | $E_{15}$ |
| System log | $T_3$ | $E_3$ |
| System log | $T_5$ | $E_5$ |
| System log | $T_7$ | $E_7$ |
| System log | $T_{12}$ | $E_{12}$ |
| Network log | $T_8$ | $E_8$ |
| Network log | $T_{10}$ | $E_{10}$ |
| Thread log | $T_{11}$ | $E_{11}$ |
| Core log | $T_9$ | $E_9$ |
| Core log | $T_{13}$ | $E_{13}$ |

FIG. 8

| | | |
|---|---|---|
| Event log | $T_1$ | $E_1$ |
| Application log | $T_2$ | $E_2$ |
| System log | $T_3$ | $E_3$ |
| Application log | $T_4$ | $E_4$ |
| System log | $T_5$ | $E_5$ |
| Application log | $T_6$ | $E_6$ |
| System log | $T_7$ | $E_7$ |
| Network log | $T_8$ | $E_8$ |
| Core log | $T_9$ | $E_9$ |
| Network log | $T_{10}$ | $E_{10}$ |
| Thread log | $T_{11}$ | $E_{11}$ |
| System log | $T_{12}$ | $E_{12}$ |
| Core log | $T_{13}$ | $E_{13}$ |
| Event log | $T_{14}$ | $E_{14}$ |
| Application log | $T_{15}$ | $E_{15}$ |

FIG. 9

METHODS AND SYSTEMS THAT IDENTIFY PROBLEMS IN APPLICATIONS

RELATED APPLICATION

Benefit is claimed under 35 U.S.C. 119(a)-(d) to Foreign Application Serial No. 201641013151 filed in India entitled "METHODS AND SYSTEMS THAT IDENTIFY PROBLEMS IN APPLICATIONS", filed on Apr. 14, 2016, by VMware, Inc., which is herein incorporated in its entirety by reference for all purposes.

TECHNICAL FIELD

The present disclosure is directed to identifying problems in an application from log files.

BACKGROUND

Many enterprises now run applications in a distributed computing environment. Any problem that causes an enterprise's application to execute improperly may have a negative impact on business, and therefore, requires immediate analysis and resolution. An application may fail to execute properly for any number of reasons including code breaks, logical errors, configuration errors, resource issues, deployment issues, functional errors, logical errors and even application user errors. Analyzing and resolving problems with an application deployed in a distributed computing environment may be further complicated by application components and data spread over multiple computer systems, such as in a data center.

Because each system of a distributed computing environment that executes an application component or stores data generates a log file, log-file analysis tools have been developed to perform log parsing, log indexing, log searching, log filtering and reporting in order to try and identify application components that fail to execute properly. However, the results obtain from most log-file analysis tools are typically statistical in nature, such as number of tasks executed, which may be helpful in monitoring an application or application component but such results are not helpful in identifying problems that occur while running an application. In particular, certain problems that relate to running an application, such as user errors, logical errors, and functionality errors, are not readily identified by log-file analysis tools, because these types of problems are not predefined. Non-predefined problems are traditionally identified by statements from users that describe their actions and experience in interacting with an application and correlate user actions with the available log files, which is a time intensive process. Log-file analysis tools also do not help correlate run-time events between sub-systems of computing environment. In addition, a number of existing log-file analysis tools require log files to be generated in a particular format, which necessitates a change in the codes used to generate the log files. As a result, log-file analysis tools are typically only helpful in identifying predefined problems and cannot be used to identify problems that are not predefined. IT managers, and in particular IT managers of distributed computing environments, seek systems and methods that identifying application problems that are not predefined.

SUMMARY

Methods that use marking, leveling and linking ("MLL") processes to identify non-predefined problems in an application by dynamically correlating events recorded in various log files generated for a use-case of the application are described. The marking process determines fact objects associated with the use-case from events recorded in the various log files, database dumps, captured user actions, network traffic, and third-party component logs in order to identify non-predefined problems with running the application in a distributed computing environment. In the marking process, error marks may be added to the fact objects associated with the use-case. The MLL methods do not assume a predefined input format and may be used with any data structure and plain log files. The MLL methods present results in a use-case trace that may be displayed in a graphical user interface. The use-case trace enables human users to monitor and troubleshoot execution of the application. The use-case trace identifies the types of non-predefined problems that have occurred and points in time when the problems occurred.

DESCRIPTION OF THE DRAWINGS

FIG. 4 shows an example of the type of content recorded in a single event message of a log file.

FIG. 5 shows example portions of an application log, event log, and operating system log.

FIG. 8 shows a table of marked fact objects identified in FIG. 7B.

FIG. 9 shows an example of time-based leveled fact objects.

DETAILED DESCRIPTION

Figure 1:
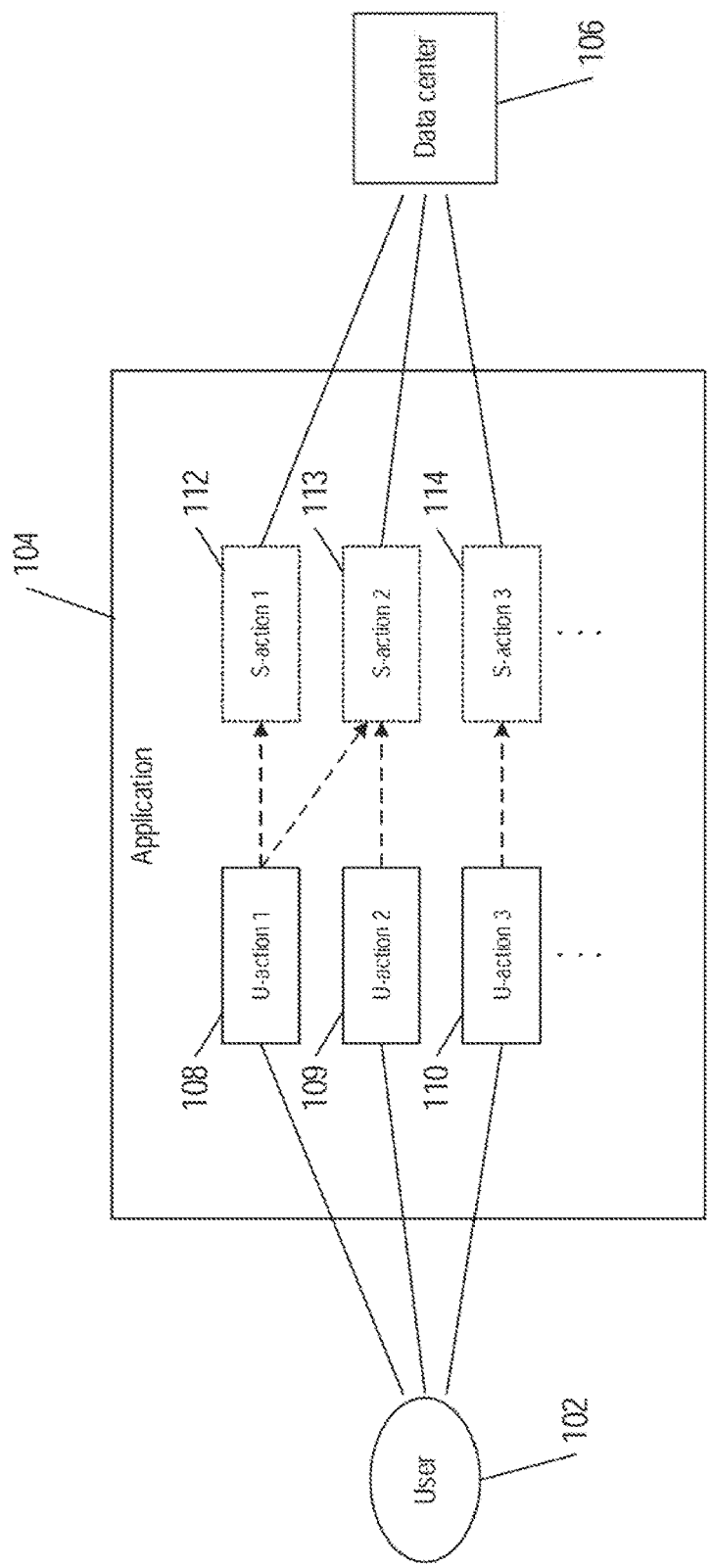
FIG. 1 shows a general use-case diagram of user interaction with an application run in a data center.

FIG. 1 shows a general use-case diagram of a user 102 interaction with an application 104 run in a data center 106. The user 102 represents any entity that interacts with the application 104. For example, the user 102 may be a human user, a virtual machine, another application, or an external system. The application 104 may ran on a single computer system in the data center 106 or the application 104 may be a distributed application with application components running on different computer systems with data stored on any number of data-storage devices of the data center 106. Solid-line blocks 108-110 represent user actions denoted by U-action 1, U-action 2, and U-action 3 the user 102 may have with the application 104. Dotted-line blocks 112-114 represent actions denoted by S-action 1, S-action 2, and S-action 3 taken by the application 104 in response to the actions taken by the user 102. For example, when the user 102 performs the action A-action 1, the application 104 performs the actions S-action 1 and S-action 2, Methods and systems use marking, leveling, and linking ("MLL") as described below to create a use-case trace of events recorded in log files associated with the user 102, application 104, and any computer systems and data-storage devices of the data center 106 in order to monitor and identify potential problems with running the application 104.

Figure 2:
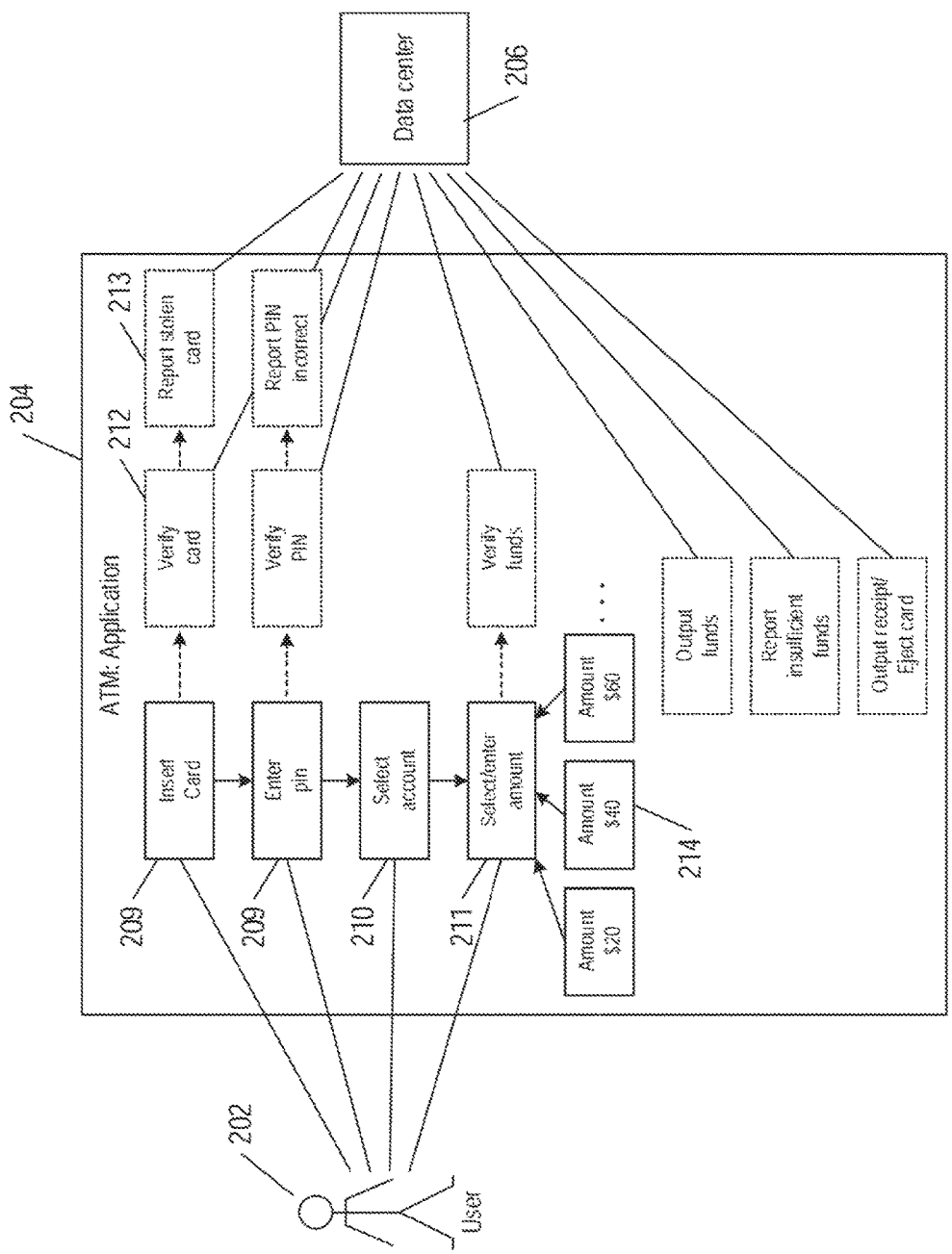
FIG. 2 shows an example use-case diagram of a human user interacting with an automatic teller machine application that runs in a data center.

FIG. 2 shows an example use-case diagram of a human user 202 interacting with an automatic teller machine ("ATM") application 204 that runs in a data center 206. Solid line blocks 208-211 represent a sequence of actions taken by the user 202 interacting with the ATM application 204. Dotted-line blocks, such as blocks 212 and 213, represent actions carried out by the application 204 in response to the actions taken by the user 202. For example, when the user 202 inserts an ATM card into the ATM card reader, the ATM application 204 executes instructions that identify information encoded on the ATM card magnetic strip to verify the card 212. The application 204 also checks the identification information against the identification information of ATM cards that have been reported stolen in the data center 206. If the ATM card has been identified as being stolen, the application 204 may direct the ATM machine to retain the card and report the card as stolen 213, otherwise the ATM application presents a display prompting the user 202 to enter a PIN number. Suppose that when the user 202 selects an amount of $40 214, the computer systems running the ATM application 204 in the data center 206 fails to properly execute application instructions. A use-case trace generated by MLL methods described below may be used to identify problems that led to the failed execution.

Figure 3:
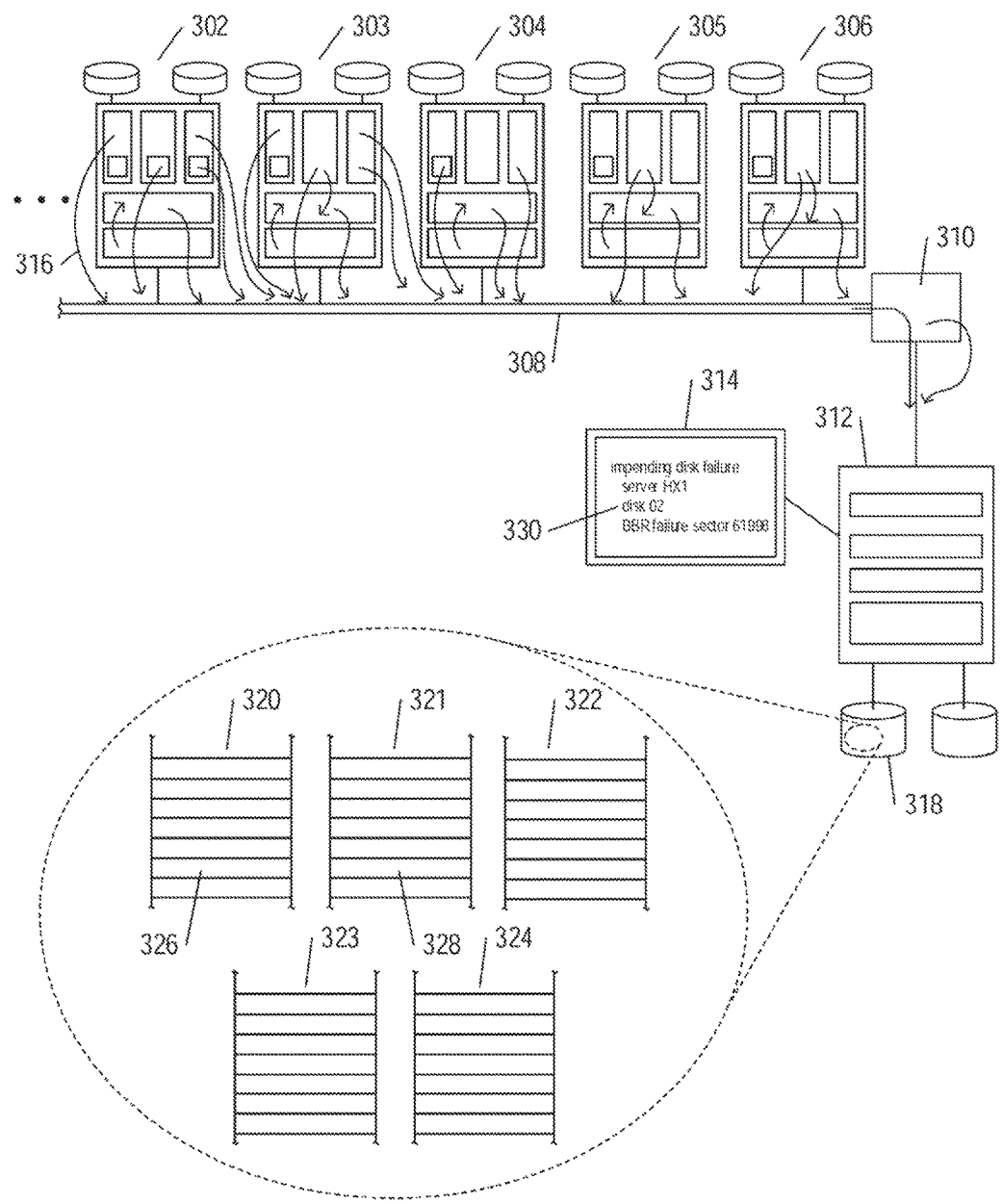
FIG. 3 shows an example of event-messages recorded in log files generated by computer systems.

FIG. 3 shows an example of event-messages recorded in log files generated by computer systems. In FIG. 3, a number of computer systems 302-306 within a distributed computing system are linked together by an electronic communications medium 308 and additionally linked through a communications bridge/router 310 to an administration computer system 312 that includes an administrative console 314. As indicated by curved arrows, such as curved arrow 316, multiple components within each of the discrete computer systems 302 and 306 as well as the communications bridge/router 310 generate event messages that are transmitted to the administration computer 312. Event messages may be relatively directly transmitted from a component within a discrete computer system to the administration computer 312 or may be collected at various hierarchical levels within a discrete computer system and then forwarded from an event-message-collecting entity within the discrete computer system to the administration computer. The administration computer 312 may filter and analyze the received event messages, as they are received, in order to detect various operational anomalies and impending failure conditions. In addition, the administration computer 312 collects and stores the received event messages in a data-storage device or appliance 318 as log files 320-324. Rectangles, such as rectangles 326 and 328, represent individual event messages. For example, log file 320 is composed of a list of event messages generated by the computer system 302.

FIG. 4 shows an example of the type of content recorded in a single event message 402 of a log file. In general, event messages are relatively cryptic, including generally only one or two natural-language sentences or phrases as well as various types of file names, path names, and, perhaps most importantly, various alphanumeric parameters. For example, the event message 402 includes event date 404 and time 406, host computer name 408, host computer IP address 410, a short natural-language phrase or sentence that describes the event 412, and alphanumerical parameters that identify the event type 414. The event date 404 and time 406 form a time stamp that indicates when the corresponding event message was recorded in the log file.

MLL methods receive as input application logs, event logs, and operating system logs. An application log file records events that are logged by the application running on one or more computer systems. The events written to the application log are determined by the application developers and not the operating system. An event log file records the actions taken by a user. For example, if the user is a human user, the events recorded may be mouse clicks or data entered, and if the user is another application, script, or system, the event recorded may be commands. An operating system log file, called a "system log" contains events that are logged by operating system components. The events are often predetermined by the operating system. Event messages recorded in system log files may contain information about device changes, device drivers, system changes, and operations.

FIG. 5 shows example portions of an application log 502, event log 504, and system log 506 for an example ATM application. The events recorded in the application log 502, system log 506 and event log 504 are interrelated. For example, at time 13:29 the application log 502 records the event "Display amount options and keypad" which corresponds to the application displaying amount options and a keypad on the ATM display. At time 13:30, the event log 504 records the event "Amount option entered" which indicates the user entered an amount and the application log records the event "Compare amount to available funds." But at 13:31, the system log 506 records an event "Out of memory," which, in turn, triggers a series of events recorded as "Eject card" at time stamp 13:32 in the application log 502, removal of the card by the user recorded as "Card removed" at time stamp 13:32 in the event log 504. The system log 506 then records a "Machine shutdown" at time 13:32, a "Machine startup" at time 13:37; and "Collect statistical data" at time 13:39 as event messages.

Although, in many cases, event messages are stored in log files, they may alternatively be streamed from event-message sources to administrative computers and other event-message sinks within a distributed computer system, stored and transferred in shared memory and distributed shared memory, or stored on physical media that is physically transported from a source computer to a receiving computer. It is convenient, in the following discussion, to diagram and discuss log files as files of log entries that each corresponds to an event message, but, in fact, there are many different types of sources of log-file entries.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. Text-search methodologies may be employed to search for relevant data within large log files.

MLL methods may also receive as input any network, thread, core event messages and other types of data structures. A network log may record network-related events such as network dumps in which raw data is copied from one place to another with little or no formatting for readability. A thread log may record thread related events, such as a thread dump. A core log file records events generated by processors. For example, a core log file records core dump events that often occur when a process of an application unexpectedly terminates.

Figure 6:
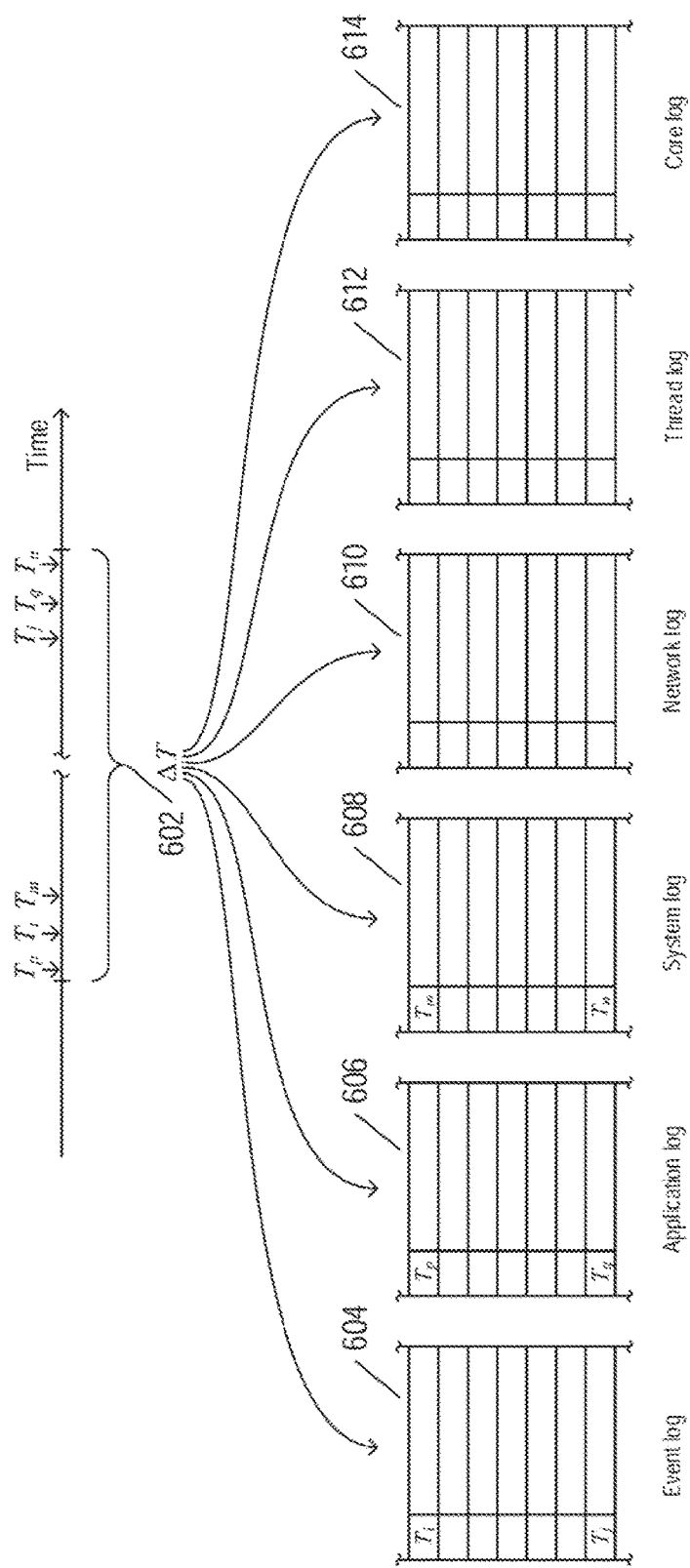
FIG. 6 show an example of continuous log file data collected in a time interval.

MLL methods may receive as input continuously recorded log-file data and other types of data in regular time intervals. FIG. 6 show an example of continuous log file data and other data collected in a time interval 602 of duration Δt. In the Example of FIG. 6, the continuous data collected are the events recorded in an event log file 604, an application log file 606, system log file 608, network log file 610, thread log file 612, and a core log file 614 within the time interval 602. For example, the first and last events recorded in the event, application, and system log files are within the time interval 602. Methods described below produce the thread log file 612 by requesting a thread dump within the time interval 602. Methods may also produce the network log file 610 and core log file 614 is the same manner by requesting a network dump that reveals network in formation and requesting a core dump that reveals core operations. Otherwise, methods may collect any core dump that may have occurred in the time interval 602. MLL methods may also receive as input snapshot data which are the events that occurred at a particular point in time. For example, a database row and a thread dump may be produced at a particular point in time.

MLL methods identify fact objects m the log files. A fact object is recorded evidence in a log file of a unique system event. A fact object may be determined from the input data and the input data may be continuous data or snapshot data. A fact object may be a single event message associated with the unique system event recorded in a log file that includes a time stamp. A fact object may be a set of logically connected event messages in a log file that are associated with the same unique system event. A fact object may be a statement or set of statements about one or more actions triggered by a user (e.g., raw text).

MLL methods use a log analysis system to identify fact objects by parsing the log files. The log analysis system identities fact objects while parsing and interpreting the log files. An example using a Java interface is given as follows:

```
1    public interface Fact
2    {
3       public JSON getContent ( );
4       public Boolean isMarkable (MarkRule rule);
5       public void mark ( );
6       public Boolean link (Fact factToBeLinked);
7    }
```

The content of a fact object in a string format may be retrieved from a log file using "getContent" method in Java script object notation ("JSON"). The getContent returns the JSON structured data that forms the fact. For example, if 5 lines of a log file taken to together form a fact, then getContent retrieves those five lines of the log file. After data has been collected in either a time interval or a snapshot, the marking process of the MLL method is used to mark fact objects that are related to a particular use-case being traced. In order to mark a fact object related to a use-case, a mark rule is passed as a parameter in the "isMarkable" function in line 4 of the public interface Fact. Mark rule performs a string comparison or pattern matching of fact objects to complex logical operations in order to identify whether a fact object can be market or not. Marking is based on the mark rule. A mark rule can be a single regular expression or multiple regular expressions that can be matched using string comparison or pattern matching to a fact object at different time intervals. If the mark rule applied to a fact object is true (i.e., the fact object is related to the use-case), then the fact object is marked and added to a marked fact object lists for the use-case. When the mark rules are created, certain mark rules are also created for error scenarios in order to identify error fact objects. Error fact objects may then be marked using the error mark rules. For example, error marks rules includes mark rules that identify user errors, logical errors, and functionality errors in fact objects.

Figure 7A:
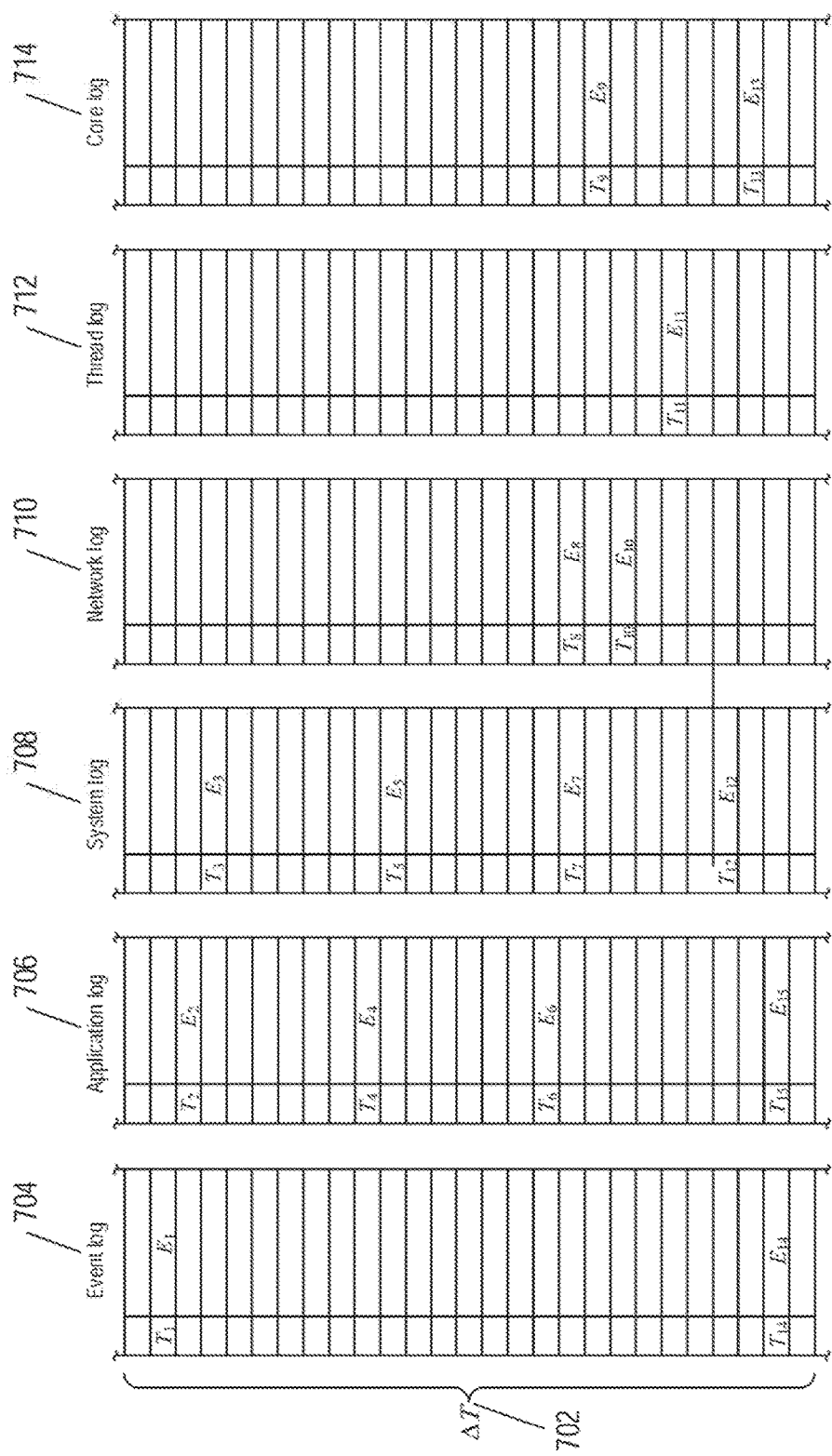
FIG. 7A shows portions of log files record in a time interval.
Figure 7B:
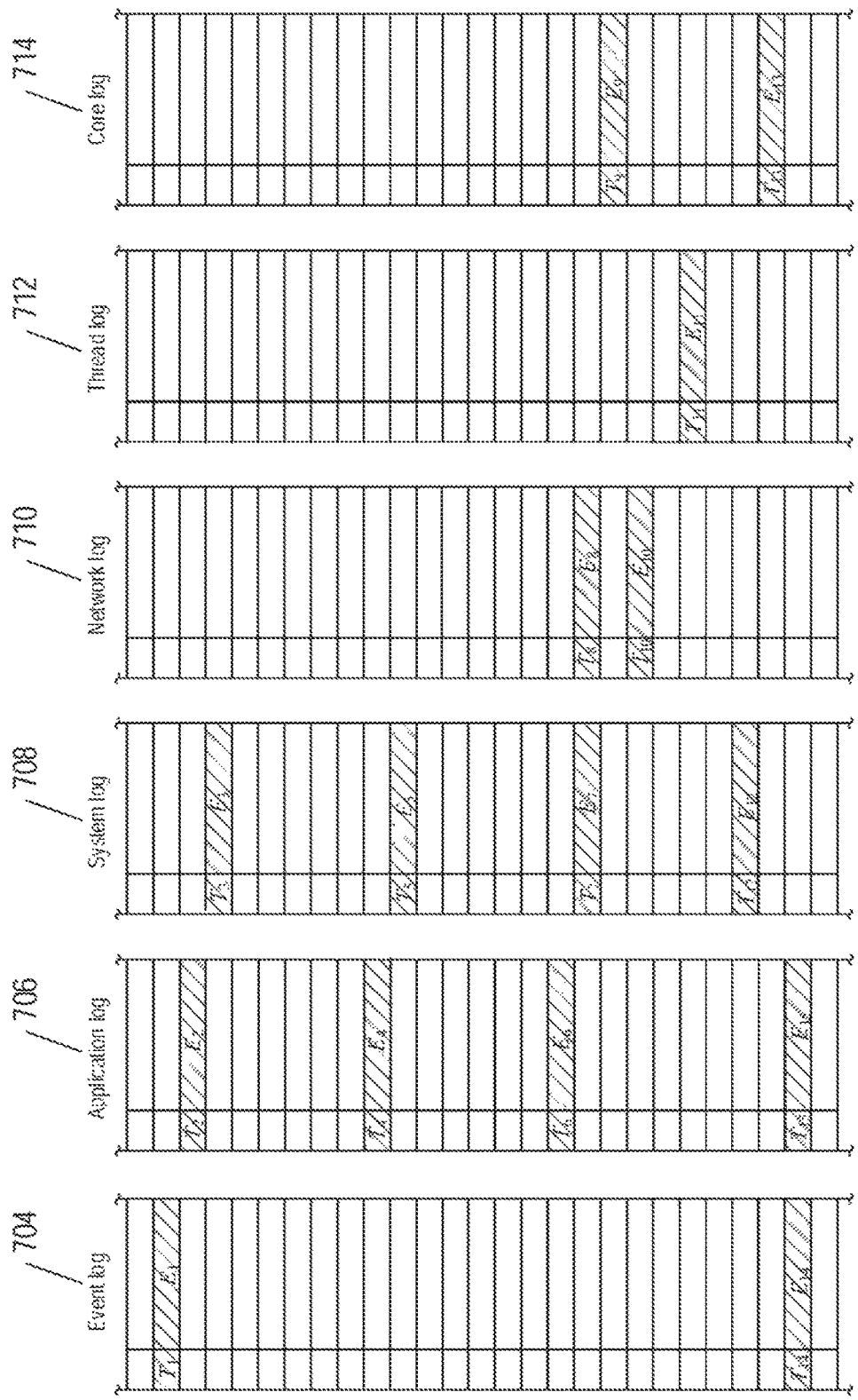
FIG. 7B shows marked fact objects in the log fries shown in FIG. 7A.

FIG. 7A shows portions of log files record in a time interval 702. The log files includes an event log 704, an application log 706, a system log 708, a network log 710, a thread log 712, and core log 714. Network packet capture may be used to collect the network log 710. A thread dump may be used to collect the thread log 712. A core dump may be used to collect the core log 714. Fact objects associated with the same use-case are identified by time stamp, $T_i$, and event messages, $E_i$, where the subscript i ranges from 1, . . . , 15. For example, in event log 704, a fact object has a time stamp $T_1$ and the associated event message is denoted by $E_1$. FIG. 7B shows each of the fact objects associated with the use-case marked by shading.

The marked fact objects are collected and combined to form a marked fact object list. FIG. 8 shows a table of the marked fact objects identified in FIG. 7B. The fact objects listed in the marked fact object list are not arranged in any particular order or sequence. The MLL method levels marked fact objects by organizing the fact objects according to one of many different leveling rules. The leveling rules include time-based leveling, sequence-based leveling, state-based leveling, and custom leveling. Time-based leveling is arranging the fact objects based on the associated time stamps. For example, time-based leveling may be carried by arranging the fact objects from earliest recorded fact objects to latest recorded fact objects. FIG. 9 shows an example of time-based leveled fact objects arranged according to time stamps in which the fact object having the earliest recorded time stamp is listed first and the fact object having the latest recorded time stamp is listed last.

The MLL method uses linking to connect fact objects in the leveled fact object list based on the order in which the fact objects appear in the leveled fact object list. The first fact object in the leveled fact object list is assigned as the starting point. Each entry in the fact object list is read from the fact object list and a link is created from the current read fact object to the next immediate fact object in the leveled fact object list. For example, the first entry in the leveled fact object list shown in FIG. 9 is event $E_1$ with time stamp $T_1$ obtained from the event log. The next fact object in the leveled fact object list is event $E_2$ with time stamp $T_2$ obtained from the application log. Linking creates a connection or link between the first entry and the next entry. The last fact object in the leveled fact object list is assigned a null link and is identified as the last fact object in the leveled fact object list. For example, the last fact object in the leveled fact object list shown in FIG. 9 is event $E_{15}$ with time stamp $T_{15}$. This fact object is assigned a null link and is identified as the last fact object in the leveled fact object list.

Figure 10:
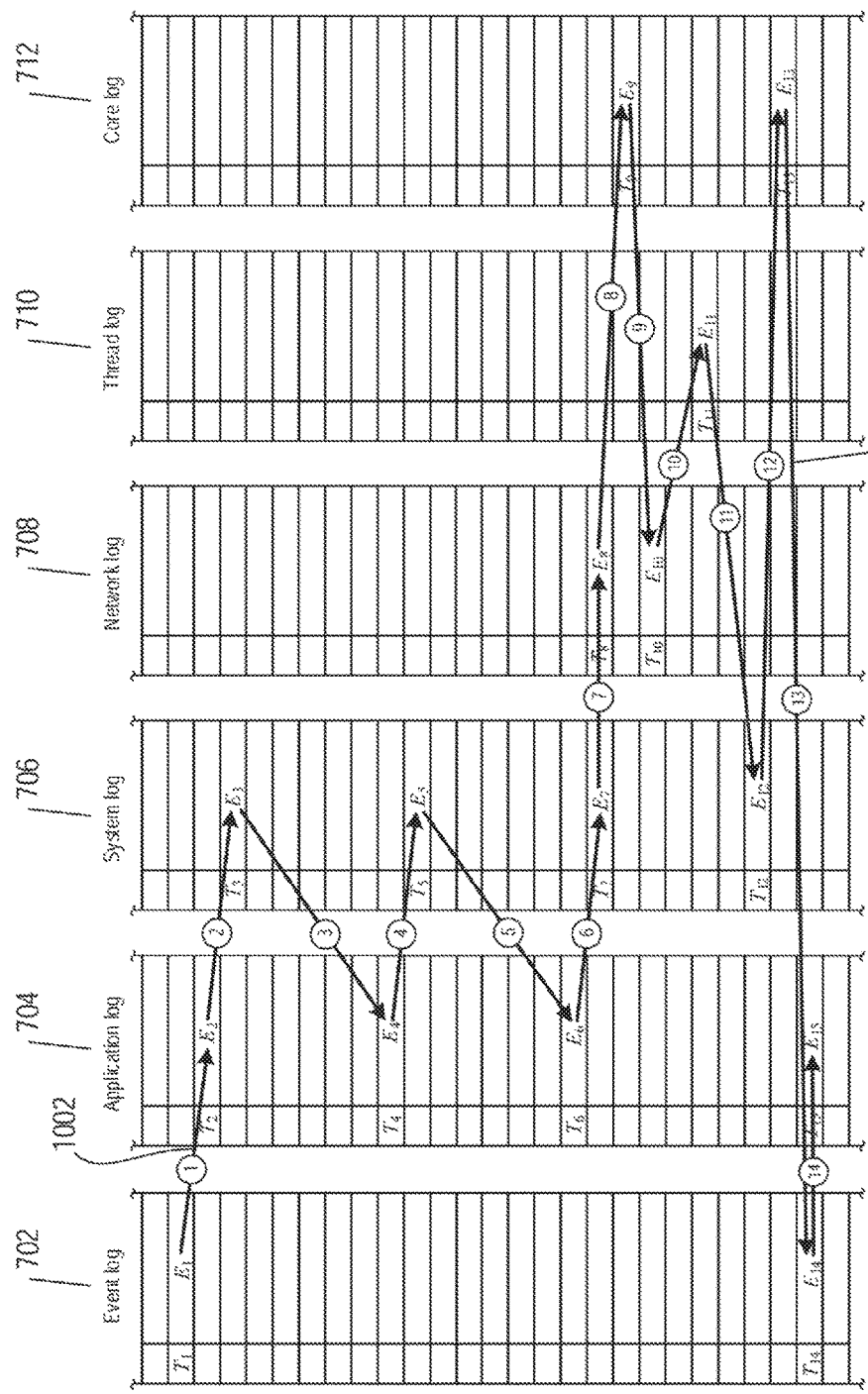
FIG. 10 shows a conceptual use-case trace.

FIG. 10 shows a conceptual use-case based trace of the linked fact objects of the event log 704, application log 706, system log 708, network log 710, thread log 712, and core log 714 shown in FIG. 7A. The use-case-based trace is composed of the links that are represented by directional arrows connecting the fact objects in order. For example, directional arrow 1002 represents a first link in the use-case-based trace denoted by "1" that connects the fact object with time stamp $T_1$ and event message $E_1$ in the event log 702 to the fact object with time stamp $T_2$ and event message $E_2$ in the application log 704. Directional arrow 1004 represents a thirteenth link in the use-case-based trace denoted by "13" that connects the fact object with time stamp $T_{13}$ and event message $E_{13}$ in the core log 712 to the fact object with time stamp $T_{14}$ to the event message $E_{14}$ in the event log 704.

Figure 11:
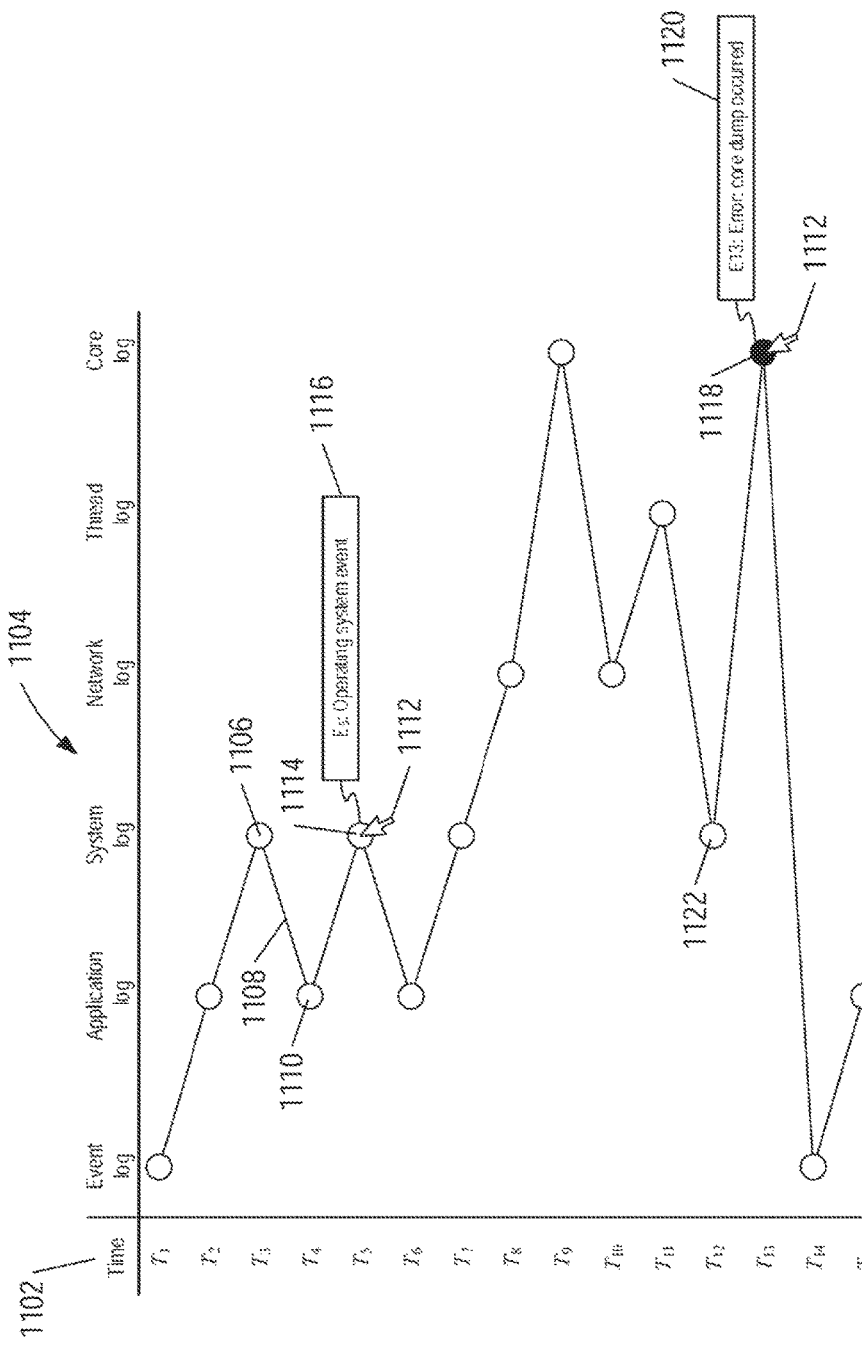
FIG. 11 shows an example graphical user interface ("GUI") of a use-case trace shown in FIG. 10.

The linked fact objects may be displayed in a graphical user interface ("GUI") with non-predefined problems that relate to the use-case of the application, such as user errors, logical errors, and functionality errors, identified. FIG. 11 shows an example GUI of a use-case trace of the use-case trace shown in FIG. 10. In the example of FIG. 11, column 1102 represents time stamps of the fact objects identified for the use-case and headings 1104 identify the log files from which the fact objects were identified. Bubbles, such as bubble 1106, represent fact objects associated with a time stamp and a log file. Lines connecting bubbles, such as line 1108 that connects bubble 1106 to bubble 1110, represents links between two fact objects in the linked and leveled fact object list. When a user of the GUI places the GUI cursor arrow on a bubble, the fact object represented by the bubble is displayed in a window. For example, when cursor arrow 1112 is placed on bubble 1114, a window 1116 appears with the event message displayed in the window.

Color coding or shading of bubbles may be used to distinguish fact objects associated with non-errors from fact objects associated with errors or problems identified in by marking. In the example GUI of FIG. 11, white colored bubble represent fact objects for which no errors or problems have been identified, and black colored bubbles represent fact objects for which errors or problems have been identified. Marking in the MLL method may be used to identify fact objects associated with errors and problem, when the marking rule is formatted to identify error scenarios. For example, when the cursor arrow 1112 is placed on black bubble 1118, the fact object represented by the black bubble is displayed in a window 1120 and an error indicated. In this example, the error describes a core dump. The user may then be able determine from placing the cursor arrow over the bubble preceding the bubble 1118 in order to identify which fact objects or computational events preceded the error.

Architecture and design details of the MLL method described above are implemented using VMDT as a base platform to troubleshoot vRealize Automation ("vRA"). vRA is a multi-tier architecture produced by VMware, Inc that is used to deploy applications in a cloud infrastructure. The components in vRA are server, load balanced web server and model server, multiple agents, multiple distributed execution managers ("DEMs") and orchestrator. VMDT is a vCenter diagnostic tool used to troubleshoot vCenter logs. VMDT provides a GUI framework and storage framework with bug tracking to retrieve log files directly from a customer problem report and a customer service request. The complete implementation may be accomplished with D3 JavaScript framework for charting and machine-flow diagram depiction.

vRA manages virtual and physical computational resources and may be used to provision virtual machines ("VMs"). VM provisioning in vRA takes into account multiple code flows that depend on endpoints and many other flows. Also these execution paths can be changed by vRA extension/customization and integrated with external systems according to a customer's needs and environment. A machine ID and workflow ID may be used as a source of information for the marking rule and time stamp from a log file as levelling rule and trace of a use case. The marking rule part of the MLL method may also be used to identify an error fact object with the words exception and error to find the fault in the use-case trace.

Figure 12A:
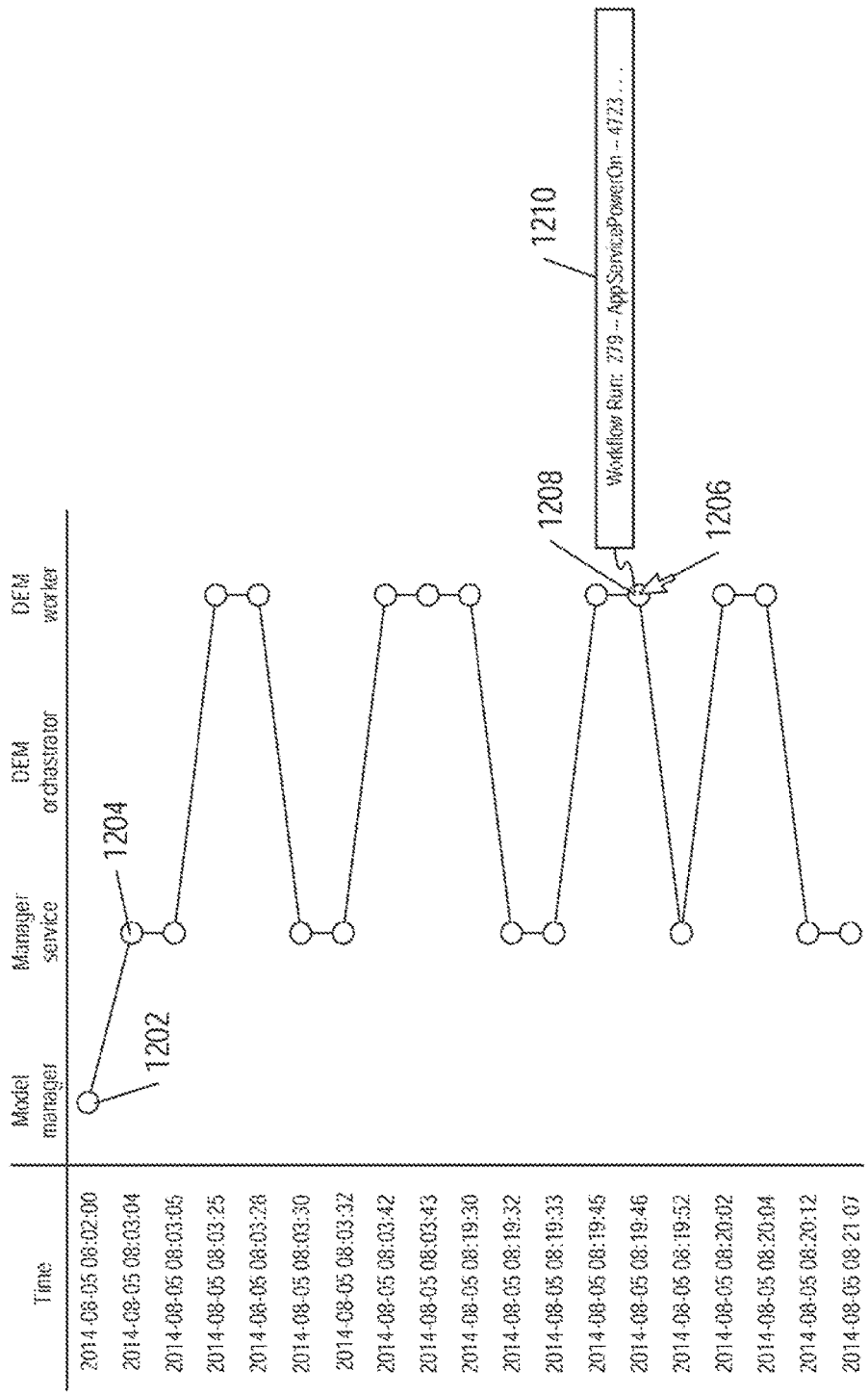
FIGS. 12A and 12B show example GUIs of use-case traces.
Figure 12B:
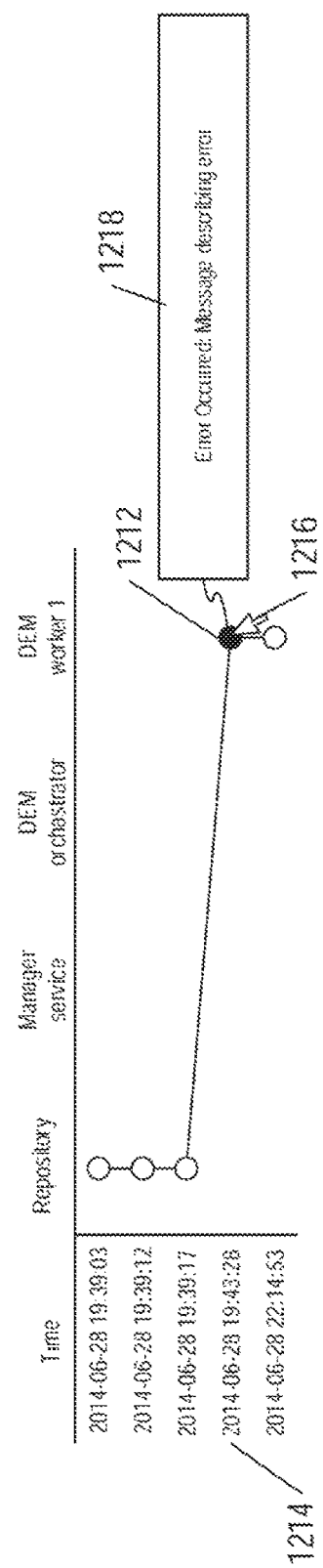

FIGS. 12A and 12B show example GUIs of use-case traces from a customer log using the MLL method described above. From the provided logs, a topology of the vRA deployments has a Web, Model Manager, Manager Service, DEM Orchestrator, DEM worker and agent components. FIG. 12A shows a GUI that displays a machine request started from a website represented by bubble 1202 which goes to model manager and them manager service represented by bubble 1204. Then there are a number of interactions between the manager service and DEM worker components, as represented by links between bubbles under the manager service and DEM worker headings. Each bubble represents a fact object that has been leveled based on the time stamp from the logs and linked, as described above. In the example of FIG. 12A, a cursor arrow 1206 is located on a bubble 1208 which reveals the detailed information about the fact object represented by the bubble 1208. FIG. 12B shows a GUI that displays a repository which goes to a DEM worker 1. Black bubble 1212 visually indicates a fact object that corresponds to an error occurred at time stamp 1214. When a cursor arrow 1216 is placed over the black bubble 1212, a window 1218 appears with a description of the error represented by the fact.

Figure 13:
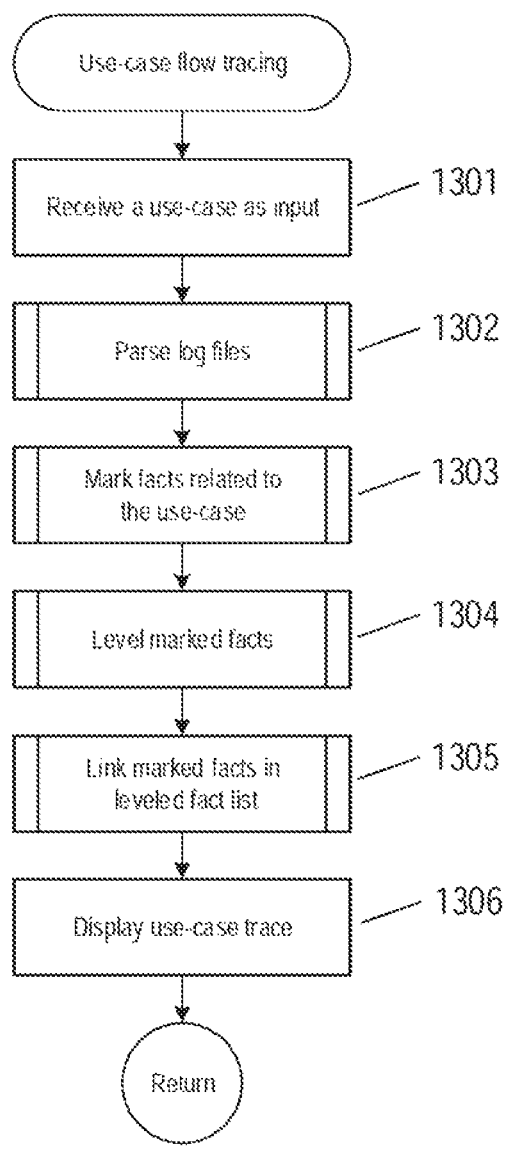
FIG. 13 shows a flow diagram of a method that traces use-cases of an application.

FIG. 13 shows a flow diagram of a method that traces use cases of an application. In block 1301, a use-case for an application identified. In block 1302, a routine "parse log files" is called to identify fact objects in the log files that are associated with a use-case. In block 1303, a routine "mark fact objects related to the use-case" is called to mark the fact objects associated with the use-case. In block 1304, a routine "level marked fact" is called to level the marked fact objects according to a leveling rule. In block 1305, a routine "link marked fact objects in leveled fact object list" is called. In block 1306, the linked marked fact objects are displayed in a GUI, as described above with reference to FIGS. 11-12.

Figure 14:
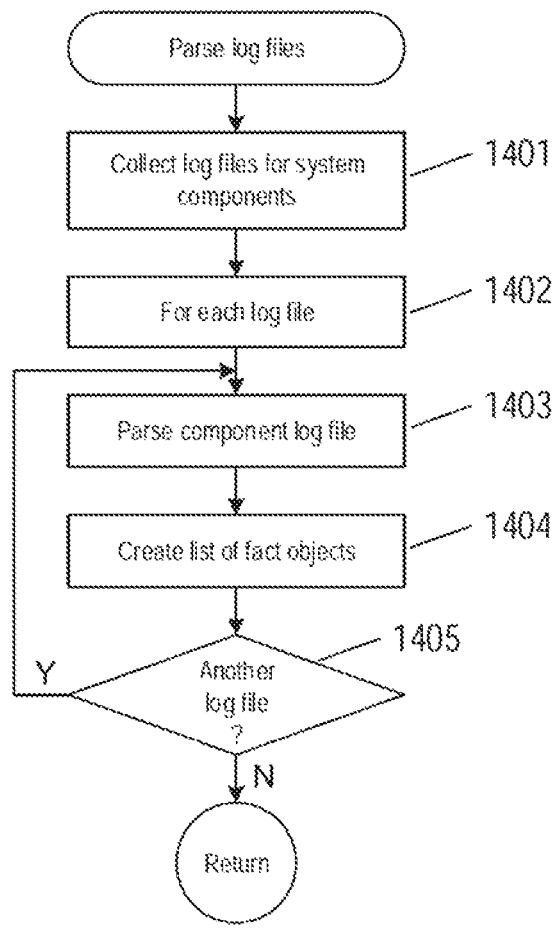
FIG. 14 shows a method of a routine "parse log files" called in FIG. 13.

FIG. 14 shows a method of the routine "parse log files" called in block 1302 of FIG. 13. In block 1401, event log files, application log files, operating system log files, network log files, thread log files, and core log files are collected and used as input. Portions of the log files recorded in time intervals or snapshots of the log files may be received, as described above with reference to FIG. 6. A for-loop beginning with block 1402 repeats the operations represented by blocks 1403 and 1404 for each log file of the system. In block 1403, a log file of a component of the system is parsed by identifying fact objects in the log file that are associated with running of the application. In block 1404, a list of fact objects is created from the fact objects, as described above with reference to FIG. 8. In decision block 1405, the operations represented by blocks 1403 and 1404 may be repeated for another log file of the system.

Figure 15:
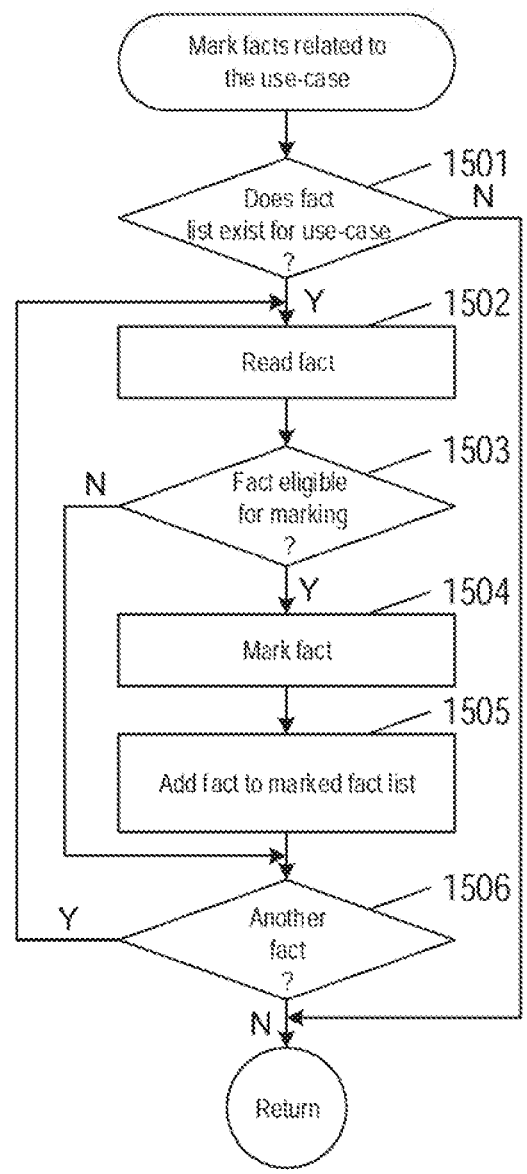
FIG. 15 shows a method of a routine "mark fact objects related to the use-case" called in FIG. 13.

FIG. 15 shows a method of the routine "mark fact objects related to the use-case" called in block 1303 of FIG. 13. In decision block 1501, when a fact object list for the use-case exists, control flows block 1502. In block 1502, a fact object is read from the fact object list. In decision block 1503, a determination is made as to whether or not the fact object is markable. If the fact object is markable, control flows to block 1504 in which the fact object is marked according to the mark rule, which include error marks, as described above with reference to FIG. 7B. In block 1505, the marked fact object is added to a marked fact object list for the use-case, as described above with reference to FIG. 8. In decision block 1506, blocks 1502-1505 are repeated for another fact.

Figure 16:
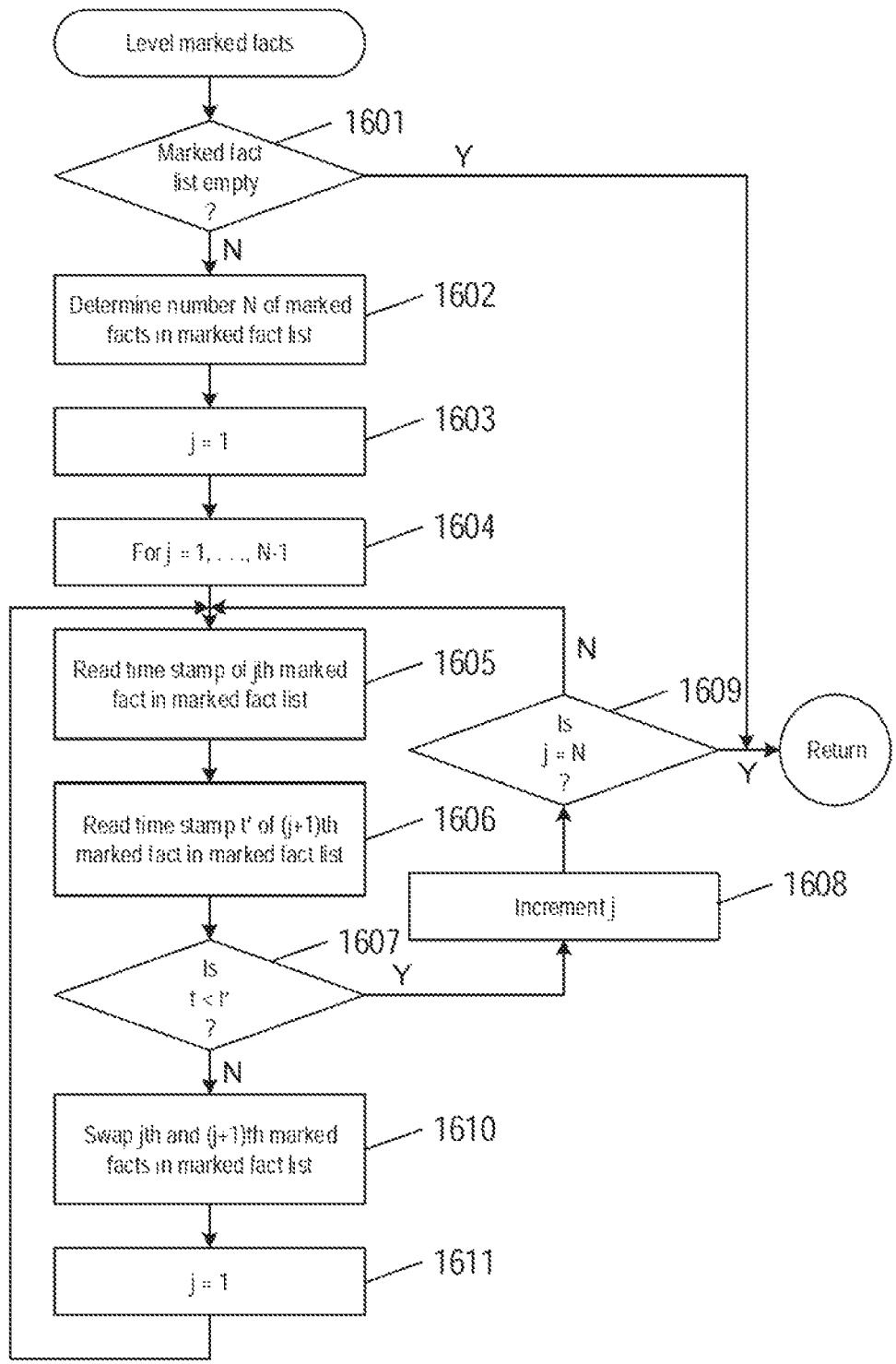
FIG. 16 shows a method of a routine "level marked fact objects" called in FIG. 13.

FIG. 16 shows a method of the routine "level marked fact objects" called in block 1304 of FIG. 13. The routine "level marked fact objects" is time-based leveling technique. In decision block 1601, when the marked fact object list is not empty, control flows to block 1602. In block 1602, the number N of marked fact objects in the marked fact object list is determined. In block 1603, a counter j is initialized to "1." A for-loop repeats the operations represented by blocks 1605-1611 for each the marked fact objects. In block 1605, a time stamp t of jth marked fact object in marked fact object list is read. In block 1606, a time stamp t' of (j+1)th marked fact object in marked fact object list is read. In decision block 1607, when t<t' control flows to block 1608 in which j is incremented. In decision block, as long j does not equal N blocks 1605-1608 are repeated. When t≥t' in decision block 1607, control flows to block 1609. In block 1610, the jth and (j+1) marked fact objects are swapped. In block 1611, the counter j is re-initialized to "1."

Figure 17:
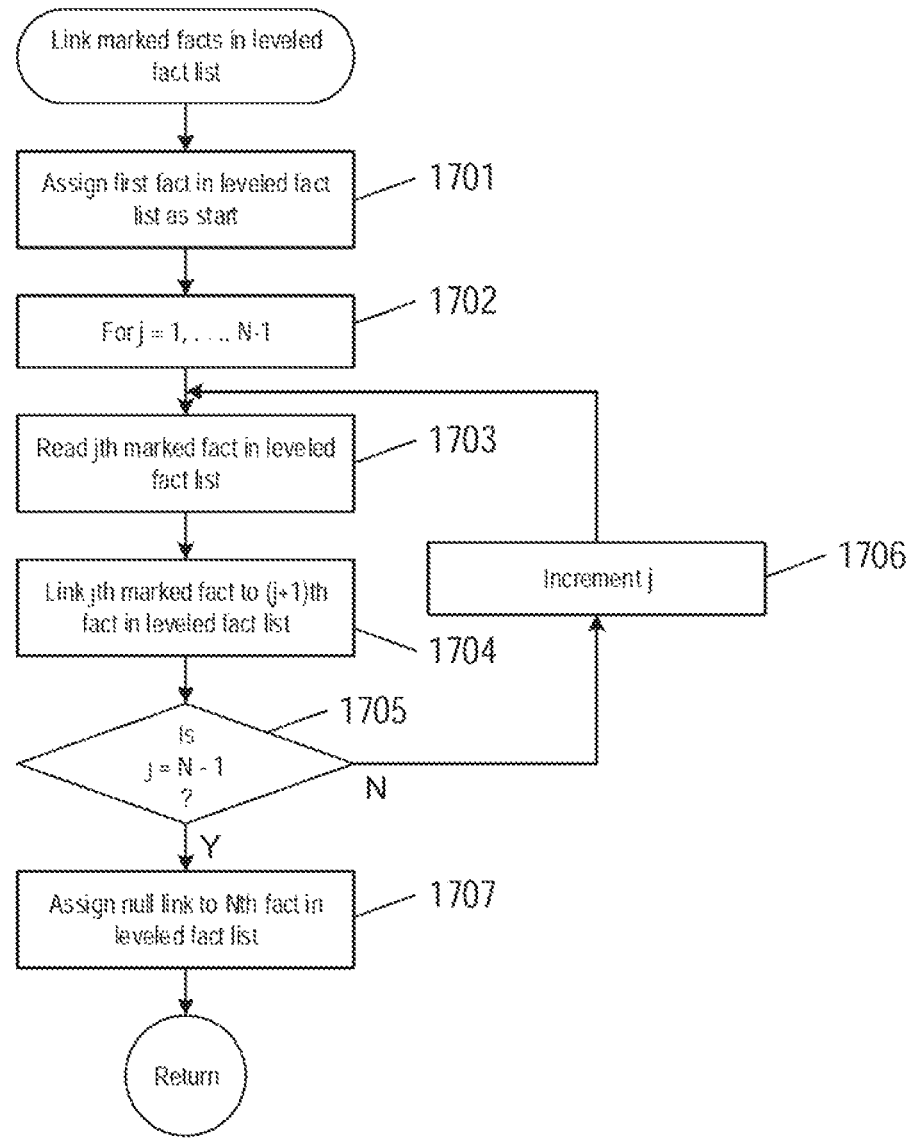
FIG. 17 shows a method of a routine "link marked fact objects in leveled fact object list" called in FIG. 13.

FIG. 17 shows a method of the routine "link marked fact objects in leveled fact object list" called in block 1305 of FIG. 13. In block 1701, a first fact object in the leveled fact object list is assigned as the start. A for-loop beginning with block 1702, repeats the operations of blocks 1703-1706 for all but the Nth fact object in the leveled fact object list. In block 1703, the jth marked fact object of the leveled fact object list is read. In block 1704, the jth marked fact object is linked to the (j+1)th marked fact object in the leveled fact object list. In decision block 1705, as long as j<N−1, control flows to block 1706 in which the index j is incremented. Otherwise, in block 1707, a null link is assigned to the Nth fact object in the leveled fact object list.

Figure 18:
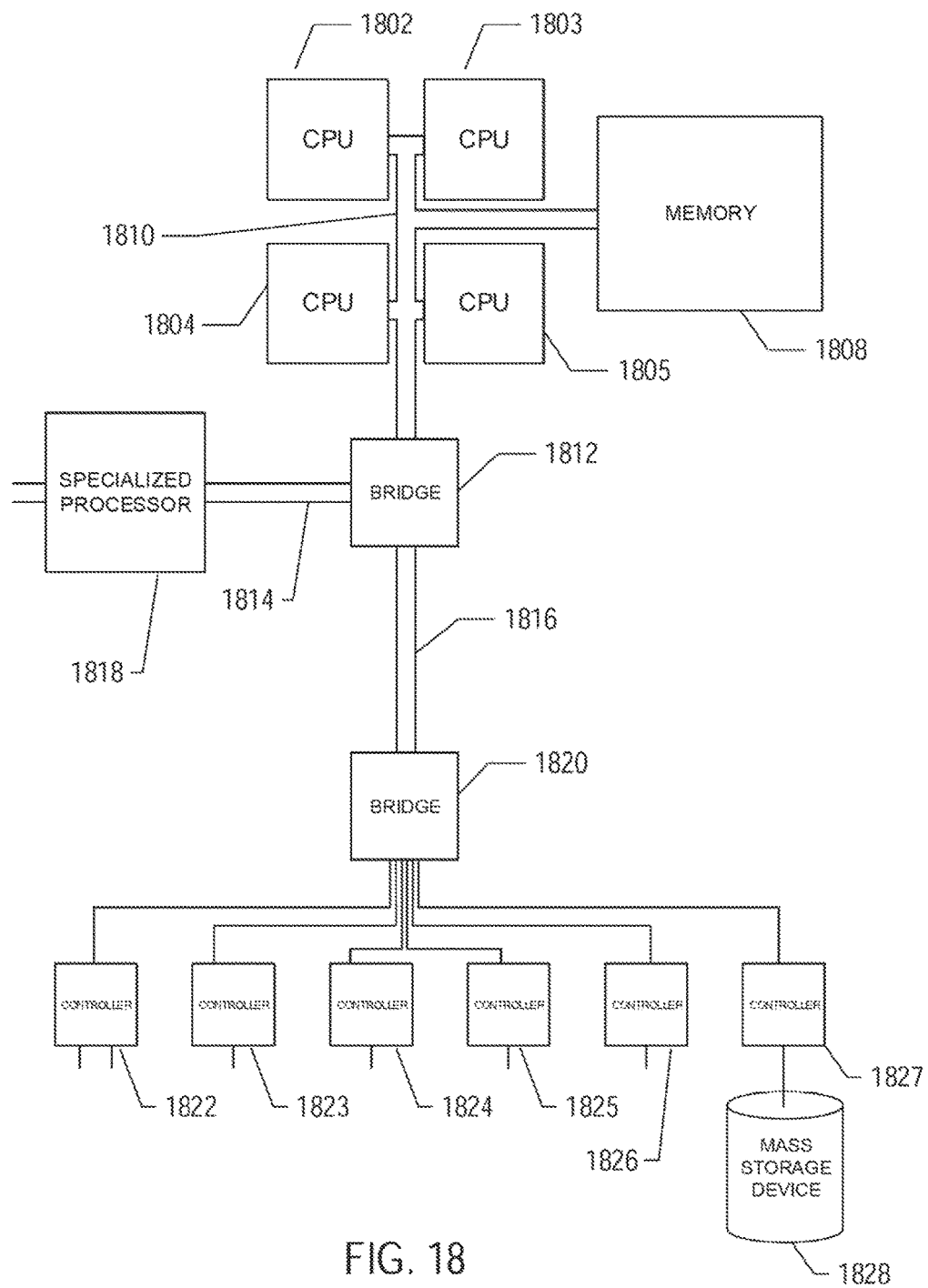
FIG. 18 shows an architectural diagram of a computer system that executes a method to trace a use-case flow of an application described above.

FIG. 18 shows an architectural diagram of a computer system that executes a method to trace a use-case flow of an application described above. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. These busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of mass-storage devices 1828, electronic displays, input devices, and other such components, subcomponents, and computational devices. The method described above is stored in on a computer-readable medium as machine-readable instructions and executed using the computer system. It should be noted that computer-readable data-storage devices (i.e., media) include optical and electromagnetic disks, electronic memories, and other physical data-storage devices.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

What is claimed is:

1. A method stored in one or more data-storage devices and executed using one or more processors of a computer system to monitor and troubleshoot execution of an application while running in a distributed computing environment, the method comprising:
  collecting log files of the distributed computing environment;
  parsing events recorded in the log files to identify fact objects associated with a use-case of the application;
  marking fact objects that relate to the use-case based on mark rules;

arranging the marked fact objects according to a leveling rule to generate a leveled fact object list of the marked fact objects;

linking marked fact objects in the leveled fact object list to generate a linked fact object list; and displaying a use-case trace of the linked fact object list in a graphical user interface ("GUI"), the use-case trace represented by connect bubbles, each bubble displays event messages of a fact object associated with the use-case in a window of the GUI when a user places a GUI cursor over the bubble.

2. The method of claim 1, wherein collecting the log files further comprises collecting an event log, an application log, and a system log produced within a time interval;

performing a thread dump to collect thread events that occurred in the time interval;

collecting network dump that occurred in the time interval; and collecting a core dump.

3. The method of claim 1, wherein collecting the log files further comprises:

collecting events in an event log, an application log, and a system log produced at point in time;

performing a thread dump to collect thread events that occurred at the point in time;

collecting a network dump that occurred in the time interval; and collecting a core dump that occurred in the time interval.

4. The method of claim 1, wherein parsing events recorded in the log files further comprises:

identify events that form fact objects associated with the use-case of the application; and forming a list of e fact objects.

5. The method of claim 1, wherein marking the fact objects that relate to the use-case further comprises performing a string comparison of fact objects to logical operations.

6. The method of claim 1, wherein marking the fact objects that relate to the use-case further comprises marking fact objects that are errors based on error mark rules.

7. The method of claim 1, wherein arranging the marked fact objects according to the leveling rule further comprises arranging the fact objects from earliest recorded fact objects to latest recorded fact objects to generate the leveled fact object list.

8. The method of claim 1, wherein linking the marked fact objects in the leveled fact object list further comprises:

reading fact object in the leveled fact object list;

identify first fact object in the leveled fact object list as a starting point;

creating a link from a current read fact object to a next immediate fact object in the leveled fact object list; and assigning a null link to the last fact object in the leveled fact object list.

9. A system to monitor and troubleshoot execution of an application while running in a distributed computing environment, the system comprising:

one or more processors;

one or more data-storage devices; and machine-readable instructions stored in the one or more data-storage devices that when executed using the one or more processors controls the system to carry out collecting log files of the distributed computing environment;

parsing events recorded in the log files to identify fact objects associated with a use-case of the application;

marking fact objects that relate to the use-case based on mark rules;

arranging the marked fact objects according to a leveling rule to generate a leveled fact object list of the marked fact objects;

linking marked fact objects in the leveled fact object list to generate a linked fact object list; and displaying a use-case trace of the linked fact object list in a graphical user interface ("GUI"), the use-case trace represented by connect bubbles, each bubble displays event messages of a fact object associated with the use-case in a window of the GUI when a user places a GUI cursor over the bubble.

10. The system of claim 9, wherein collecting the log files further comprises collecting an event log, an application log, and a system log produced within a time interval;

performing a thread dump to collect thread events that occurred in the time interval;

collecting network dump that occurred in the time interval; and collecting a core dump.

11. The system of claim 9, wherein collecting the log files further comprises:

collecting events in an event log, an application log, and a system log produced at point in time;

performing a thread dump to collect thread events that occurred at the point in time;

collecting a network dump that occurred in the time interval; and collecting a core dump that occurred in the time interval.

12. The system of claim 9, wherein parsing events recorded in the log files further comprises:

identify events that form fact objects associated with the use-case of the application; and forming a list of the fact objects.

13. The system of claim 9, wherein marking the fact objects that relate to the use-case further comprises performing a string comparison of fact objects to logical operations.

14. The system of claim 9, wherein marking the fact objects that relate to the use-case further comprises marking fact objects that are errors based on error mark rules.

15. The system of claim 9, wherein arranging the marked fact objects according to the leveling rule further comprises arranging the fact objects from earliest recorded fact objects to latest recorded fact objects to generate the leveled fact object list.

16. The system of claim 9, wherein linking the marked fact objects in the leveled fact object list further comprises:

reading fact object in the leveled fact object list;

identify first fact object in the leveled fact object list as a starting point;

creating a link from a current read fact object to a next immediate fact object in the leveled fact object list; and assigning a null link to the last fact object in the leveled fact object list.

17. A non-transitory computer-readable medium encoded with machine-readable instructions that implement a method carried out by one or more processors of a computer system to perform the operations of collecting log files of distributed computing environment;

parsing events recorded in the log files to identify fact objects associated with a use-case of an application running in the distributed computing environment;

marking fact objects that relate to the use-case based on mark rules;

arranging the marked fact objects according to a leveling rule to generate a leveled fact object list of the marked fact objects;

linking marked fact objects in the leveled fact object list to generate a linked fact object list; and displaying a use-case trace of the linked fact object list in a graphical user interface ("GUI"), the use-case trace represented by connect bubbles, each bubble displays event messages of a fact object associated with the use-case in a window of the GUI when a user places a GUI cursor over the bubble.

18. The medium of claim 17, wherein collecting the log files further comprises collecting an event log, an application log, and a system log produced within a time interval;

performing a thread dump to collect thread events that occurred in the time interval;

collecting network dump that occurred in the time interval; and collecting a core dump.

19. The medium of claim 17, wherein collecting the log files further comprises:

collecting events in an event log, an application log, and a system log produced at point in time;

performing a thread dump to collect thread events that occurred at the point in time;

collecting a network dump that occurred in the time interval; and collecting a core dump that occurred in the time interval.

20. The medium of claim 17, wherein parsing events recorded in the log files further comprises:

identify events that form fact objects associated with the use-case of the application; and forming a list of the fact objects.

21. The medium of claim 17, wherein marking the fact objects that relate to the use-case further comprises performing a string comparison of fact objects to logical operations.

22. The medium of claim 17, wherein marking the fact objects that relate to the use-case further comprises marking fact objects that are errors based on error mark rules.

23. The medium of claim 17, wherein arranging the marked fact objects according to the leveling rule further comprises arranging the fact objects from earliest recorded fact objects to latest recorded fact objects to generate the leveled fact object list.

24. The medium of claim 17, wherein linking the marked fact objects in the leveled fact object list further comprises:

reading fact object in the leveled fact object list;

identify first fact object in the leveled fact object list as a starting point;

creating a link from a current read fact object to a next immediate fact object in the leveled fact object list; and assigning a null link to the last fact object in the leveled fact object list.

\* \* \* \* \*